(12) United States Patent
Gordy

(10) Patent No.: US 8,516,921 B2
(45) Date of Patent: Aug. 27, 2013

(54) CABLE ASSEMBLY WITH MULTI-DIRECTIONAL CONNECTOR

(75) Inventor: Donald G. Gordy, Moberly, MO (US)

(73) Assignee: Dura Operating, LLC, Auburn Hills, MI (US)

( * ) Notice: Subject to any disclaimer, the term of this patent is extended or adjusted under 35 U.S.C. 154(b) by 1149 days.

(21) Appl. No.: 12/416,582

(22) Filed: Apr. 1, 2009

(65) Prior Publication Data
US 2010/0251847 A1    Oct. 7, 2010

(51) Int. Cl.
*F16C 1/22* (2006.01)
(52) U.S. Cl.
USPC .............. 74/502.6; 74/502.4; 24/665; 24/675
(58) Field of Classification Search
USPC ................... 74/502.4–502.6, 501.6, 501.5 R, 74/500.5; 24/664, 665, 672–676; 403/315, 403/319; 285/317, 319, 305
IPC .......................................................... F16C 1/14
See application file for complete search history.

(56) References Cited

U.S. PATENT DOCUMENTS

| | | | |
|---|---|---|---|
| 3,538,940 A * | 11/1970 | Graham | 285/317 |
| 4,118,131 A | 10/1978 | Schnitzius | |
| 4,327,600 A | 5/1982 | Bennett | |
| 4,406,177 A | 9/1983 | Bennett et al. | |
| 4,581,953 A | 4/1986 | Walston et al. | |
| 4,590,819 A | 5/1986 | Spease et al. | |
| 4,595,310 A | 6/1986 | Ausprung | |
| 5,000,614 A * | 3/1991 | Walker et al. | 285/305 |
| 5,241,879 A | 9/1993 | Kelley | |
| 5,265,495 A * | 11/1993 | Bung et al. | 74/502.6 |
| 5,518,332 A * | 5/1996 | Katoh | 74/502.4 |
| 5,613,792 A | 3/1997 | Terada et al. | |
| 5,682,798 A * | 11/1997 | Malone | 74/502.6 |
| 5,937,705 A | 8/1999 | Corbett et al. | |
| 6,021,689 A * | 2/2000 | Moore | 74/502.6 |
| 6,098,489 A * | 8/2000 | Van Zanten et al. | 74/502.6 |
| 6,109,132 A * | 8/2000 | Frye | 74/502.4 |

(Continued)

FOREIGN PATENT DOCUMENTS

| | | |
|---|---|---|
| CH | 503917 | 2/1971 |
| DE | 3422926 A1 | 1/1986 |
| DE | 29612817 | 9/1996 |
| DE | 19717446 A1 | 1/1998 |
| DE | 19731039 A1 | 1/1999 |
| DE | 19813721 A1 | 10/1999 |

(Continued)

OTHER PUBLICATIONS

Written Opinion & International Search Report for PCT/US10/029355, mailed Nov. 16, 2010, 9 pages.

*Primary Examiner* — Phillip A Johnson
*Assistant Examiner* — Daniel Yabut
(74) *Attorney, Agent, or Firm* — Reising Ethington; Matthew J. Schmidt; Dean B. Watson

(57) ABSTRACT

A shift cable assembly in one implementation may include a conduit, a core received within the conduit, a rod coupled to an end of the core, a slide tube in which the rod is received, and a multi-directional connector. The connector may have a housing coupled to the rod, a first surface with a first opening, a second surface with a second opening, and a cavity communicated between the first and second openings. The cavity is adapted to receive a component through either one of the first and second openings, and a fastener extends into the cavity between the first and second openings to engage a component received in the cavity and retain the component relative to the housing.

6 Claims, 7 Drawing Sheets

(56) References Cited

U.S. PATENT DOCUMENTS

| | | |
|---|---|---|
| 6,161,451 A | 12/2000 | Gleason, II |
| 6,241,730 B1 | 6/2001 | Alby |
| 6,733,201 B2 | 5/2004 | Wack et al. |
| 7,559,714 B2 * | 7/2009 | Ruhlander .................. 74/502.6 |
| 2002/0104402 A1 | 8/2002 | Ruhlander |
| 2004/0037624 A1 | 2/2004 | Gordy et al. |
| 2005/0016317 A1 * | 1/2005 | Sanchez et al. .............. 74/502.4 |
| 2006/0039748 A1 | 2/2006 | Ruhlander |

FOREIGN PATENT DOCUMENTS

| | | |
|---|---|---|
| DE | 19927055 A1 | 12/2000 |
| EP | 0800010 A1 | 10/1997 |
| FR | 2355197 A1 | 1/1978 |
| FR | 2634839 A1 | 2/1990 |
| GB | 624748 | 6/1949 |
| JP | 2001-323918 | 11/2001 |
| WO | WO 9716653 A1 * | 5/1997 |

* cited by examiner

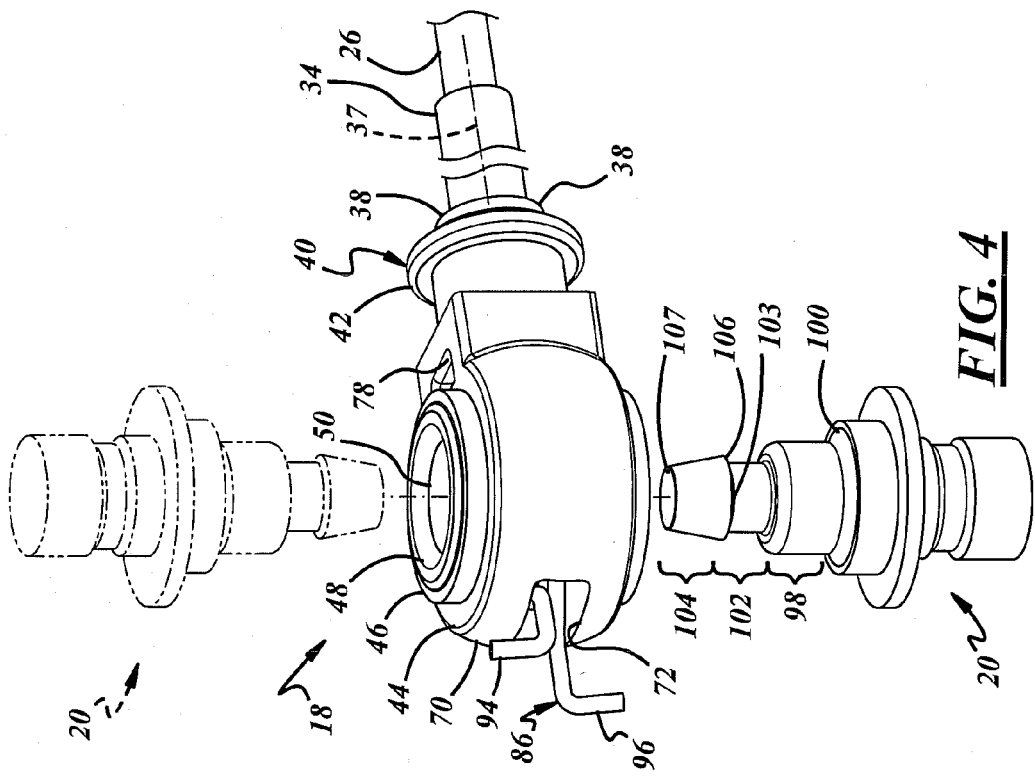
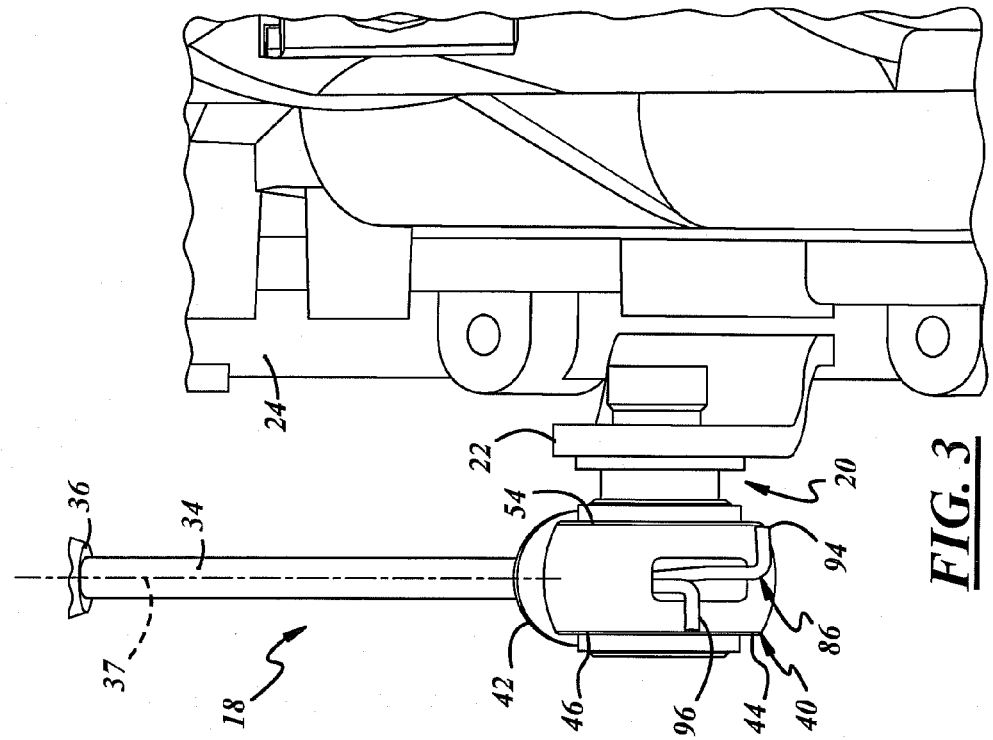

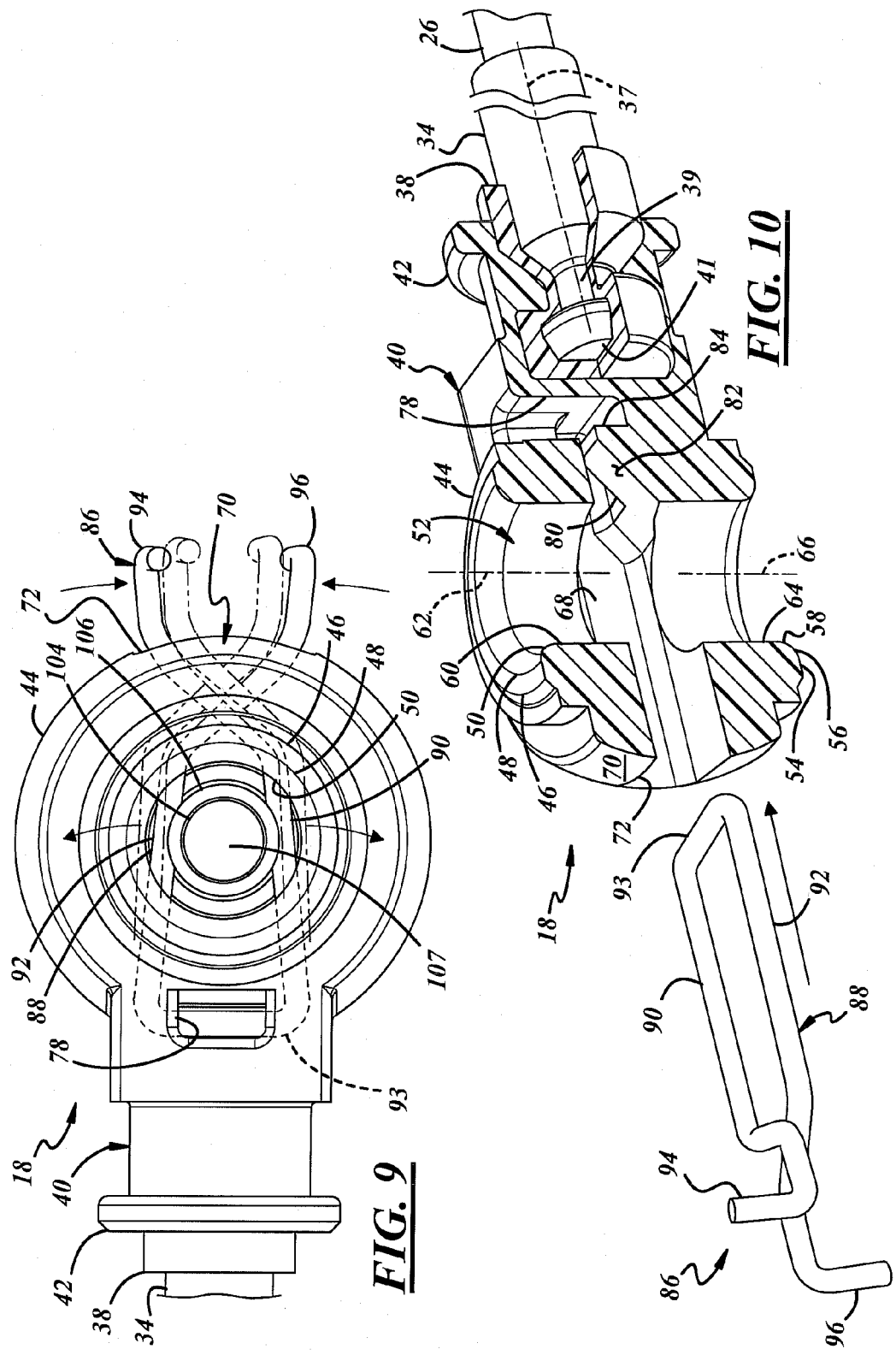

CABLE ASSEMBLY WITH MULTI-DIRECTIONAL CONNECTOR

TECHNICAL FIELD

The present disclosure relates generally to a cable assembly and more particularly to a cable with a multi-directional connector.

BACKGROUND OF THE DISCLOSURE

Motion-transmitting remote control cable assemblies, sometimes referred to as "Bowden cables" or "push-pull cables," are used for transmitting both force and travel along a curved path in aircraft, automotive, and marine environments. Known cable assemblies can be used for transmitting load and motion in push, pull and/or rotary type applications. In the automotive environment, typical applications include but are not limited to parking brakes, accelerators, hood releases, brake releases, trunk releases, seat controls, park lock, tilt wheel controls, fuel filler doors, transmission shifter cables, powered actuators, and hydraulic control cables.

A motion-transmitting remote control cable assembly for transmitting motion along a curved path typically includes a flexible core element slidably enclosed within a flexible outer sheath (conduit) with end fittings attached to both ends of each respective member. These fittings attach and react to load from the conduit to its mounting points and from the core element to its mounting points. The core element is adapted at one end to be attached to a member to be controlled whereas the other end is attached to an actuator for moving the core element within the outer sheath. The outer sheath is adapted to be secured by the fittings to a support structure.

SUMMARY OF THE DISCLOSURE

A shift cable assembly in one implementation may include a conduit, a core received within the conduit, a rod coupled to an end of the core, a slide tube in which the rod is received, and a multi-directional connector. The connector may have a housing coupled to the rod, a first surface with a first opening, a second surface with a second opening, and a cavity communicated between the first and second openings. The cavity is adapted to receive a component through either one of the first and second openings, and a fastener extends into the cavity between the first and second openings to engage a component received in the cavity and retain the component relative to the housing.

A shift cable assembly in another implementation may include a conduit, a core received within the conduit, a rod coupled to the core, a fitting coupled to the rod and adapted to be connected to a support structure to couple the core to the support structure and a multi-directional connector having a housing coupled to the rod. The housing may have a cavity and a pair of opposed openings leading to the cavity so that the cavity is adapted to receive a component through either one of the openings. A fastener is carried by the housing and has a body that is resilient and has a minimum effective opening size that is smaller than at least a portion of the component to be received within the housing but which may be enlarged when the component is inserted into the housing to permit a portion of the component to pass through the opening of the body and then resiliently returned toward its unflexed position to radially overlap a portion of the component and retain the component within the cavity.

A shifter assembly in one implementation may have a shift lever movable among a plurality of positions and a cable assembly including a conduit, a core received within the conduit and having one end operably coupled to the shift lever, a rod coupled to the core at an end opposite the shift lever, a fitting adapted to be connected to a support structure to couple the core to the support structure, and a multi-directional connector. The connector may have a housing coupled to an end of the rod opposite the core. And the housing may have a first surface with a first opening leading to a cavity, and a second surface with a second opening also leading to the cavity so that the cavity is adapted to receive a component through either one of the first and second openings. The connector may further include a fastener carried by the housing to fasten the component to the multi-directional connector whereby the housing is retained to the component in the same manner whether the component is initially received in the first opening or second opening.

BRIEF DESCRIPTION OF THE DRAWINGS

The following detailed description of preferred implementations and best mode will be set forth with regard to the accompanying drawings, in which:

FIG. 3 is a side view of the multi-directional connector of FIG. 2;

FIG. 4 is an exploded view of the component and the multi-directional connector of FIGS. 1-3, without the cable and illustrating attachment of the component to the connector along either one of two directions;

FIG. 9 is a top view of the multi-directional connector of FIG. 5;

FIG. 10 is a partially sectional view of the multi-directional connector of FIG. 8, with the wire clip being inserted into the housing;

DETAILED DESCRIPTION OF PREFERRED EMBODIMENTS

Figure 1:
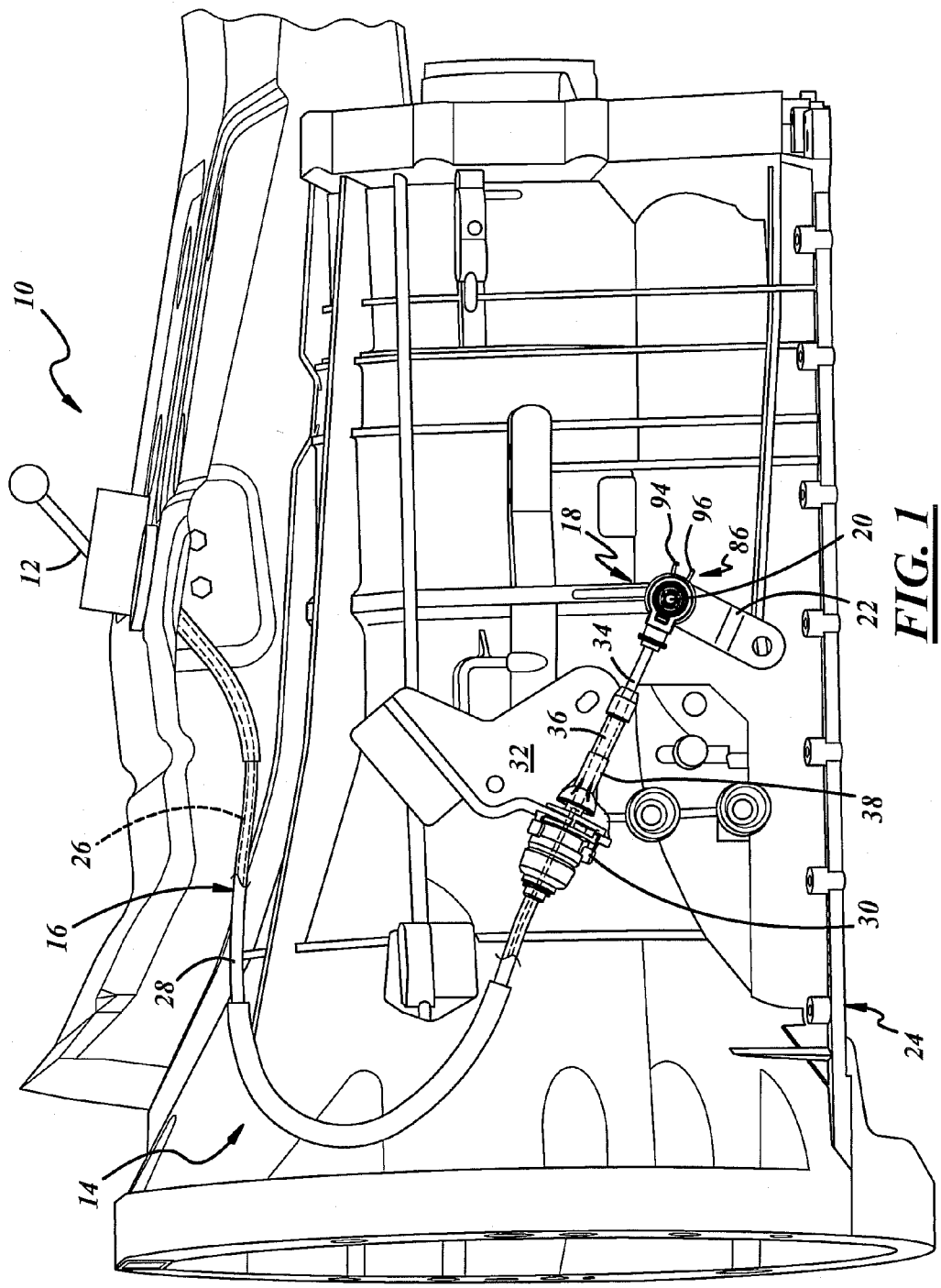
FIG. 1 is an overview of one implementation of a cable assembly used in a shifter assembly for a transmission application.
Figure 2:
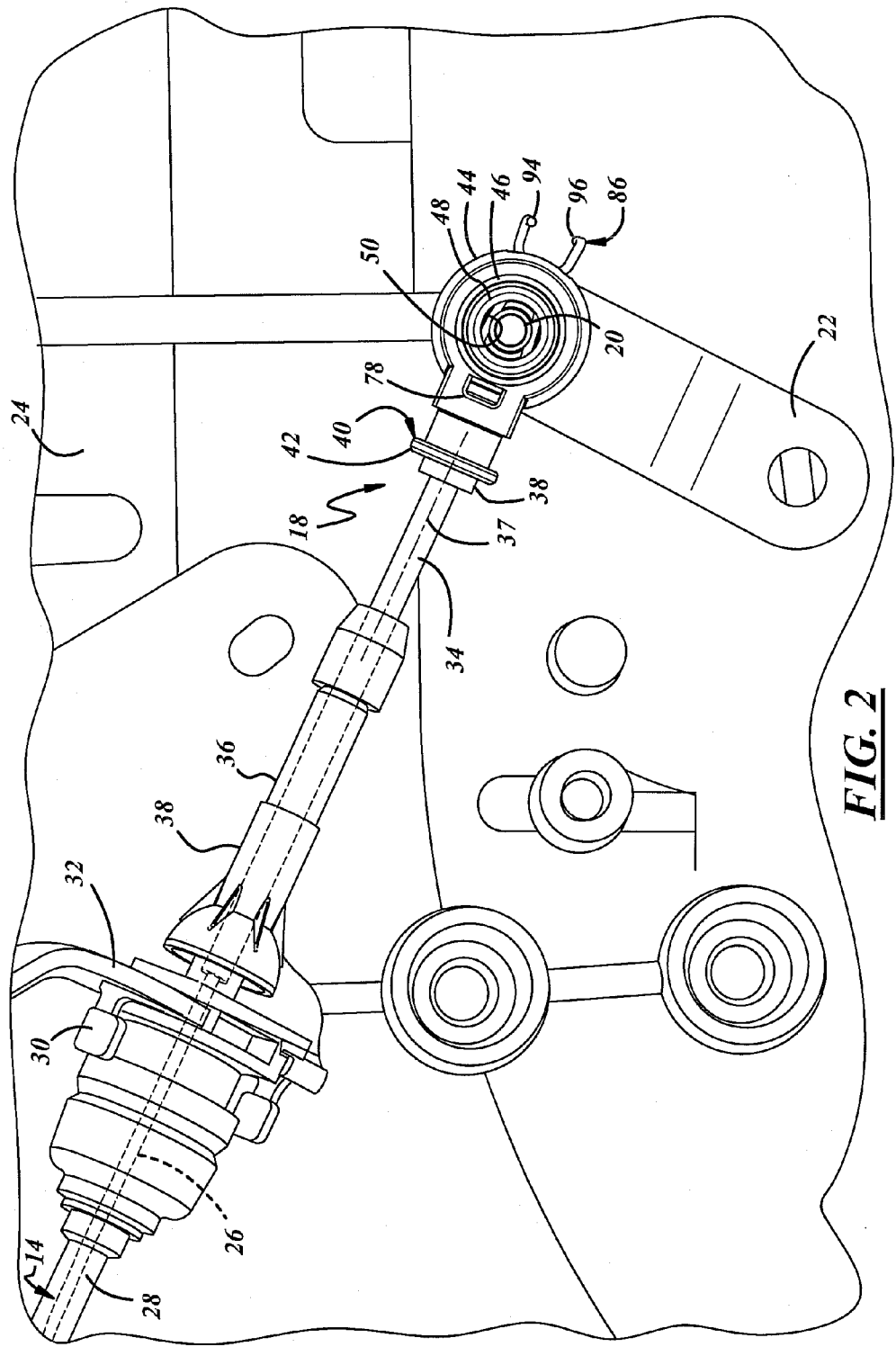
FIG. 2 is an enlarged view of a portion of FIG. 1 including a multi-directional connector and a component generally as shown in FIG. 1.

Referring in more detail to the drawings, FIGS. 1-3 illustrate one implementation of a shifter assembly 10 having a shift lever 12 and a cable assembly 14 associated with the shift lever 12. The cable assembly 14 may include a cable 16 coupled to the lever 12. The cable assembly 14 may also have a multi-directional connector 18 ("connector") that may be used to couple the cable 16 to a component 20 along one of two or more directions (FIG. 4) to facilitate the assembly process by increasing an overall rate of production, reducing related labor costs and providing various other advantages. The component 20 may be a control pin or the like associated with a control arm 22 or other feature of a vehicle transmission 24. The component may also be a pin or the like coupled to the shift lever 12. In this manner, the shifter assembly 10 may be used in a transmission application of a vehicle. Of course, the shifter assembly 10 and/or the cable assembly 14 may be used in other applications.

Figure 6:
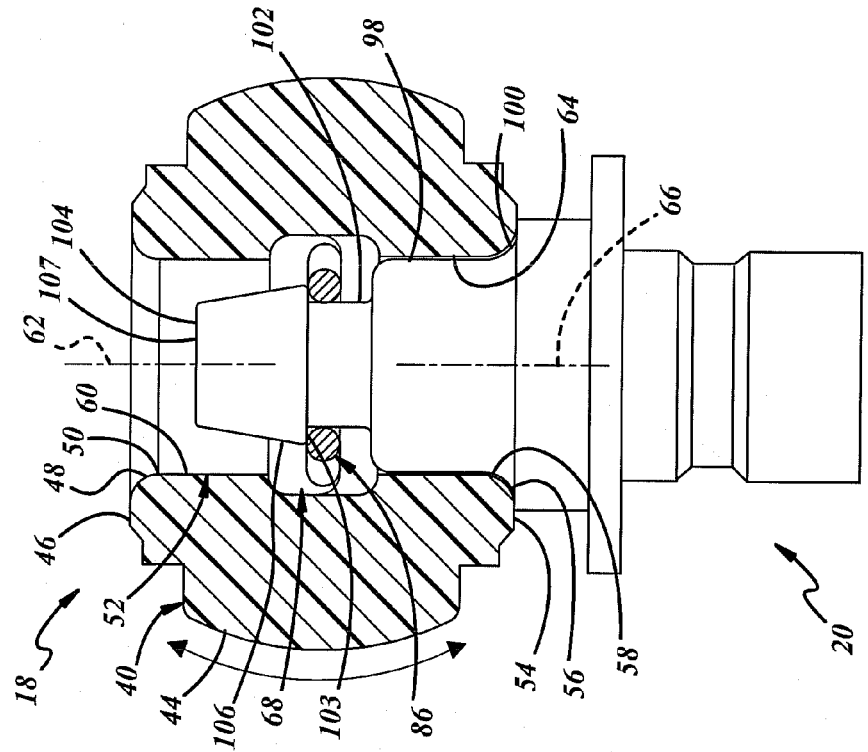
FIG. 6 is a partially sectional view of the multi-directional connector and the component of FIG. 5.
Figure 5:
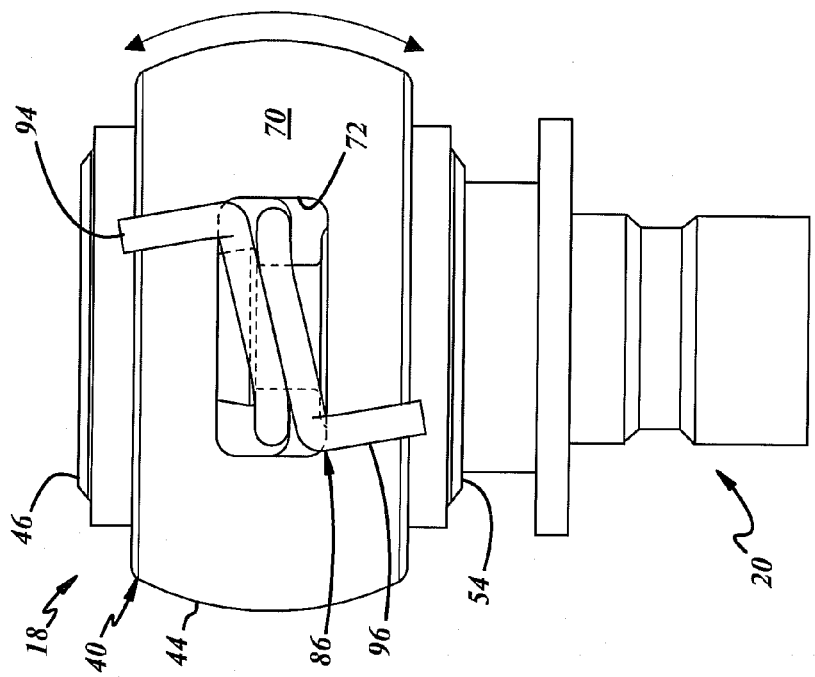
FIG. 5 is an end view of the component and the multi-directional connector of FIGS. 1-3.

Referring to FIGS. 4 and 6, the component 20 may have a shank 98 and a shoulder 100 extending generally radially from the shank 98. The component 20 may also have a neck 102 extending from an end of the shank 98 opposite the shoulder 100, and a head 104 extending from an end of the neck 102 opposite the shank 98. The head 104 may have a largest diameter portion 106 that is larger in diameter than the neck 102, and a flange 103 extending between the neck 102 and the largest diameter portion 106. The flange 103 in one form is a planar annular flange extending radially from the neck 102. However, the flange may instead be curved, frustoconical or otherwise extend somewhat axially along the component 20. In addition, the head 104 may be frustoconical and taper in diameter from the largest diameter portion 106 toward its tip 107. The neck 102 and the head 104 may be spaced apart from the shoulder 100 by a predetermined distance, and the shank 98 may have a predetermined diameter. The component 20 may be a one-piece body that may be made of metal such as steel or various other materials, as desired.

Referring back to FIG. 1, the shift lever 12 may be located in a passenger compartment of the vehicle. The shift lever 12 may be movable to a plurality of positions that may be indicative of various gear selections or modes that may be selected by a driver or other operator. These gear selections may include park, reverse, neutral, overdrive, first, second, a sequential upshift, a sequential downshift or any combination thereof. Of course, the shift lever 12 may indicate other selections for various automatic transmissions, semi-automatic transmissions or other human machine interfaces.

Referring still to FIG. 1, the cable 16 may include an inner core element 26 that may have one end operably coupled to the shift lever 12 so that shift lever may push and pull the core element 26 as the driver moves the shift lever 12 among its positions. The cable 16 may also include an outer sheath or conduit 28 that may surround at least a portion of the inner core element 26. The cable assembly 14 may further include an end fitting 30 that may couple the conduit 28 to a mounting bracket 32 which may be carried by the transmission 24.

Referring to FIGS. 1 and 2, the connector 18 may include a rod 34 which may be staked or otherwise coupled to an end of the inner core element 26 opposite the shift lever 12, so that core element 26 may in turn move the rod 34 as the driver moves the shift lever 12 among its positions. The rod 34 may extend through a swivel tube 36 or the like as is known in the art, and the swivel tube 36 may be mounted to a shield or a end fitting 38. The rod 34 may be a solid shaft with a circular cross section. Of course, the rod 34 may instead be hollow and/or have a noncircular cross section.

Figures 7, 8:
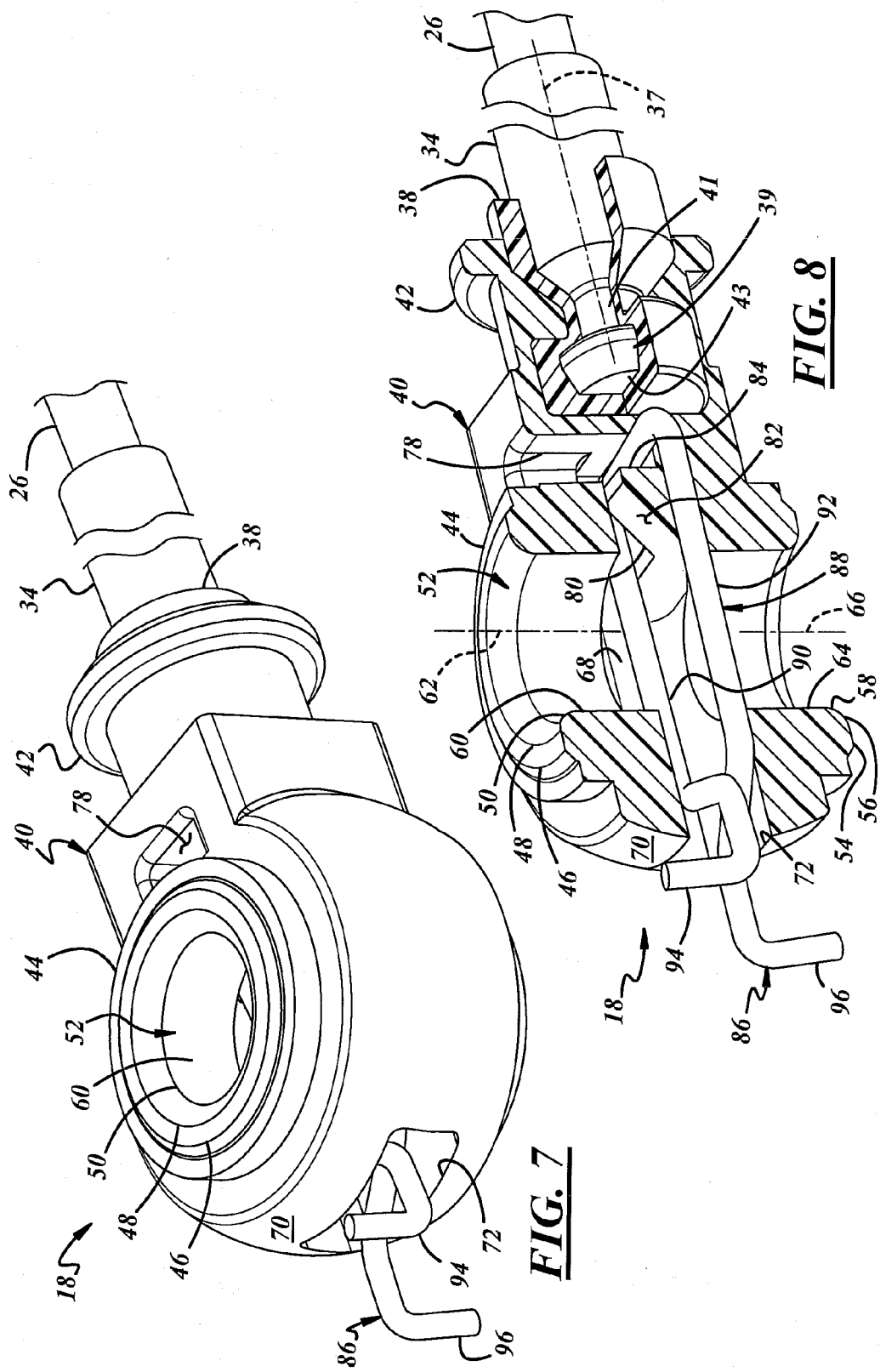
FIG. 7 is an enlarged view of the multi-directional connector of FIG. 4.
FIG. 8 is a perspective view partially in section of the multi-directional connector of FIG. 7, with the connector including a housing and a wire clip carried by the housing.

Referring to FIG. 8, the rod 34 may have a central axis 37 that may end with a retention feature 39. This retention feature 39 may include a reduced diameter neck 41 that may terminate with a generally circular end or circumferential flange 43 which may have a diameter that may be greater than the diameter of the neck 41. Of course, the retention feature 39 may instead have an opening, a slot, a hook or various other retention or fastening features.

As also shown in FIG. 8, the connector 18 may also have an isolator fitting 38 that may be disposed on or adjacent to the retention feature 39 of the rod 34. The isolator fitting 38 in one form may be overmolded onto at least the circumferential flange 43 and the neck 41 of the rod 34. In addition, the connector 18 may also have a housing 40 with a base 42 disposed on or adjacent to the isolator fitting 38 to reduce vibrations transmitted between the rod 34 and the housing 40. In one example, the base 42 may be overmolded onto the isolator fitting 38. Of course, the base 42 or other portion of the housing 40 may be carried by any portion of the rod 34, with or without the isolator fitting 38.

Referring to FIG. 4, the housing 40 may further include a retainer 44 that may be coupled to the component along 20 any one of two or more directions. For example, the component 20 may be coupled to the retainer 44 along one direction through its top side or along another direction through its bottom side, with both directions being transverse to the central axis 37 of the rod 34. Of course, the component 20 may instead be coupled to other portions of the housing along various directions that may or may not be transverse to the central axis 37. The retainer 44 may extend from the base 42 opposite the rod 34. As best shown in FIG. 6, the retainer 44 may have a first surface 46 with a first annular fillet 48 that may define a first opening 50 leading to a cavity 52. The first opening 50 may be circular with a first diameter. The retainer 44 may also have a second surface 54 with a second annular fillet 56 that may define a second opening 58 also leading to the cavity 52. The second opening 58 may be diametrically opposite the first opening 50 on the retainer 44. Of course, the first and second openings may be offset or spaced apart from each other along other directions and/or by other angles. The second opening 58 may be circular with a second diameter that may be generally equal to the first diameter of the first opening 50. However, the first and second openings can have different sizes with respect to each other, may be noncircular and may not have fillets.

Referring still to FIG. 6, the cavity 52 may include a first conduit 60 that may be communicated with the first opening 50. The first conduit 60 may have a first sectional width or diameter and a first central axis 62 that may extend generally transversely with respect to the central axis 37 of the rod 34 (FIG. 8). Of course, the first central axis 62 may not be transverse to the central axis 37 of the rod 34. In addition, the cavity 52 may also include a second conduit 64 that may be communicated with the second opening 58. The second conduit 64 may have a second sectional width or diameter that may be generally equal to the first sectional width of the first conduit 60. Of course, the first and second conduits may have unequal widths with respect to each other and may be noncircular, as desired. Further, the second conduit 64 may have a second central axis 66 that may be co-linear with the first central axis 62 of the first conduit 60. It is contemplated that the first and second central axes 62, 66 may not be co-linear. The second central axis 66 may extend generally transversely from the central axis 37 of the rod 34 or be disposed in other configurations with respect thereto (FIG. 8). The cavity 52 may also include a central chamber 68 that may be open to both the first and second conduits 60, 64. The central chamber 68 may be spaced apart from the first and second openings 50, 58 by generally equal distances. Of course, the central chamber 68 in another form may be disposed closer to one of the openings than the other.

Referring to FIG. 10, the retainer 44 may also have a sidewall 70 that may extend between the first and second surfaces 46, 54, and an aperture 72 may be formed through the sidewall 70. The aperture 72 may extend and be open to the central chamber 68.

As also shown in FIG. 10, a pocket 78 may be provided laterally spaced from the openings 50, 58 and may be communicated with the central chamber 68 opposite the aperture 72. The retainer 44 may also have a barb 80 for carrying or holding the fastener in the housing 40. The barb 80 may extend into or adjacent to the pocket 78. This barb 80 may have a ramped surface 82 that may extend from the central chamber 68 toward the pocket 78, and a catch 84 that may be spaced apart from the central chamber 68. Of course, the catch 84 may instead be disposed within the central chamber or other portions of the housing 40 and may extend from the aperture 72 toward the central chamber 68.

The connector 18 may also include a fastener adapted to fasten the component 20 to the housing 40. As shown in FIG. 10, the fastener in one form may be a resilient clip 86 that in assembly may be received through the aperture 72, the central chamber 68, over the ramped surface 82 and behind the catch 84 within the pocket 78. The clip 86 may have a wire-form body 88 with opposed legs 90, 92 and a bight 93 that may be adapted to slide over ramped surface 82 and engage the catch 84 of the barb 80 within the pocket 78 to inhibit or prevent removal of the clip 86 from the housing 40. The fastener may be made of metals such as steel or various other materials.

Referring back to FIG. 8, the body 88 may be located relative to the rod 34, so that the body 88 is generally aligned with the central axis 37 of the rod 34, radially overlaps the circumferential flange 43 and is axially spaced apart from the flange 43. As shown in FIG. 9, the body 88 may also have first and second ends 94, 96 that may extend from a respective one of the legs 90, 92, and the ends may extend or cross over each other and protrude out of the housing 40 through the aperture 72 opposite the rod 34. This arrangement may provide clearance from the rod 34 when manually accessing and/or operating the wire clip 86 exterior of the housing 40.

Referring again to FIG. 8, the legs 90, 92 may be located in the central chamber 68 so that in at least one implementation they are equally spaced from the first and second openings 50, 58. The legs 90, 92 also may be spaced apart from each other by a distance less than the minimum diameters of the openings 50, 58 and central chamber 68 so that the legs 90, 92 protrude into the cavity 52 and define a minimum effective opening size through which the component 20 may be received. The legs 90, 92 may extend radially into the cavity 52 a like distance so that the legs are evenly spaced from the axes 62, 66. The minimum effective opening size defined between the legs 90, 92 may be greater than the diameter of the tip 107 for receiving the tip 107. The legs 90, 92 may be resilient or flexible so that the legs 90, 92 may be displaced apart from each other to enlarge the opening between them and permit wider portions of the head 104 of the component 20 to pass through and between the legs. After the head 104 has passed therethrough, the legs may resiliently return toward or all the way to their original positions wherein the legs are disposed behind the head 104 and adjacent to the neck 102, and radially overlap the head 104 and flange 103 to resist removal of the head 104 from the cavity 52. The minimum effective opening size may be less than the diameter of the neck 102 to provide some tension on the neck 102 and ensure the legs 90, 92 overlap the flange 103.

As also shown in FIG. 8, the legs 90, 92 may be linear and generally coplanar with respect to each other. Of course, the legs 90, 92 may instead converge or diverge relative to each other, be parallel or may have curved, contoured or other non-linear forms to overlap more of the flange 103 and/or head 104 and strengthen the retention of the component 20.

During assembly (FIGS. 4 and 6), the component 20 may be inserted through either the first opening 50 or the second opening 58 and into the central chamber 68 to facilitate quick attachment between the component 20 and the multi-directional connector 18, thereby increasing the rate of overall production and decreasing labor costs. After entering either the first or second openings 50, 58, the tip 107 of the component 20 is received between the legs 90, 92 (FIG. 8). Upon further insertion of the component 20, the head 104 may displace the legs 90, 92 apart from each other to permit the head to pass the legs 90, 92 and the legs to resilient return toward or to their unflexed position after the head passes. The legs 90, 92 may have a stiffness or resiliency so that between 4 to 50 Newtons of force may sufficiently spread the legs 90, 92 to permit the head 104 to pass between the legs 90, 92. Of course, the legs 90, 92 may have a stiffness or resiliency greater or less than this range so that more or less force can be used to spread the legs 90, 92 and pass the head 104. The flexibility of the legs 90, 92 may allow the clip to engage components of different sizes and/or shapes, with little or no change of the connector 18 required. Also, the flexible legs 90, 92 may overcome substantial variances and/or tolerances and can render the size of the housing less relevant or permit greater tolerances within the housing.

The shoulder 100 may limit the extent to which the component 20 is inserted into the cavity 52. For example, the shoulder 100 of the component 20 may engage either the first surface 46 or second surface 54, depending on which opening received the component 20, after the head 104 has passed the legs 90, 92.

In addition, the legs 90, 92 may engage and fasten to the component 20 at a location spaced apart from the first surface 46 or first opening 50 by a first distance. The legs 90, 92 may also be spaced apart from the second surface 54 or second opening 58 by a second distance which may be generally equal to the first distance. The legs 90, 92 may radially overlap opposed sides of the head 104 to provide a mirror image metal-to-metal retention construction to distribute forces on the head 104 and strengthen retention of the head 104 within the cavity 52. The flange 103 in one form may be planar to increase the force by which the clip 86 retains the component 20 in the cavity 52. Of course, the flange 103 in another form may instead taper, curve, be frustoconical or otherwise extend somewhat axially along the component 20, so that the clip 86 may retain the component 20 in the cavity 52 by less force, which may be desirable depending on the design requirements. As best shown in FIGS. 6 and 8, the axes of the component 20, the first conduit 60 and the second conduit 64 may extend generally transversely from the central axis 37 to inhibit or prevent removal of the component 20 from the connector 18 during normal operation of the shifter assembly 10 as the rod 34 moves back and forth along its axis 37. Of course, the axes may instead be oriented along other directions with respect to the central axis 37.

As also shown in FIG. 6, the neck 102 may be spaced apart from the first surface 46 and the second surface 54 by generally equal distances, so that the neck 102 may be located within the central chamber 68 whether the component 20 is inserted through either the first opening 50 or the second opening 58. In other words, the neck 102 may be spaced apart from the shoulder 100 by a predetermined distance that may be generally equal to both the distance between the central chamber 68 and the first surface 46, and the distance between the central chamber 68 and the second surface 54. The shank 98 may have a diameter sufficiently smaller than the diameters or widths of the first and second conduits 60, 64 so that, when the shank 98 is fully received within the cavity 52, the first and second conduits 60, 64 may snugly receive and support the shank 98. The mirror image construction provides the same performance, such as retention and/or release, whether the component 20 is inserted through either the first opening 50 or the second opening 58.

In dismantling or disassembling the connector 18 from the component 20 (FIG. 9), the first and second ends 94, 96 of the clip 86 may be pressed or otherwise moved toward each other to spread the legs 90, 92 apart from each other by a distance that may be greater than the largest diameter portion 106 of the head 104, or at least sufficiently apart to facilitate removal of the component 20 from the clip 86 and housing 40. In at least some implementations, between about 4 and 50 Newtons of force may be needed to sufficiently move the ends 94, 96 toward each other to spread apart the legs 90, 92 and permit removal of the head from between the legs so that the connector 18 can be removed from the component 20. It is contemplated that the legs 90, 92 may have a higher or lower stiffness or resiliency or otherwise be adapted to allow the component 20 to be removed from the connector 18 in response to more or less than 25 Newtons of force used in pulling the component 20 from the connector 18.

Figure 11:
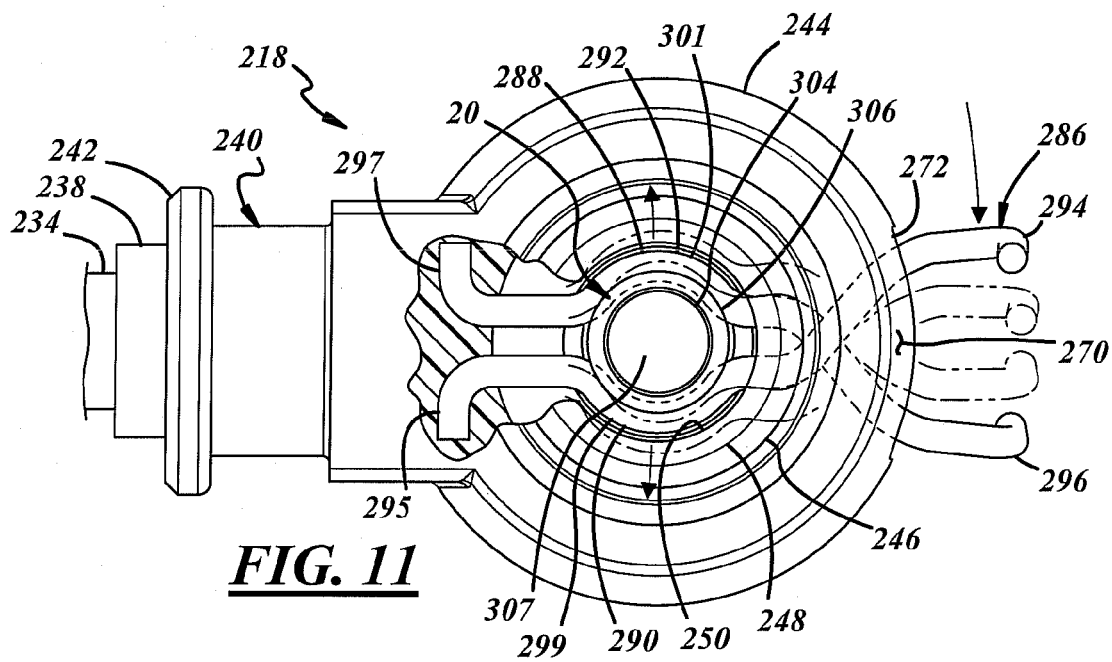
FIG. 11 is a top view of a multi-directional connector in another form, with a housing and a fastener including two cantilevered legs independently carried by the housing.

Referring now to FIG. 11, a multi-directional connector 218 in another form may have a housing 240 and a fastener 286, and may be similar to the connector 18 of FIG. 9 having the housing 40 and the fastener 86. However, the fastener 286 in this form may include two cantilevered legs 290, 292 that may be independently carried by the housing 240, as compared to the one-piece wire clip 86 including the body 88. Each leg 290, 292 may be made of any suitable material including metal such as a resilient metal wire or other materials. Of course, one or more of the legs 290, 292 may instead be integral portions of the housing 240 and may have non-wire forms. In addition, the legs 290, 292 may have anchor portions 295, 297, respectively, which may be insert molded, press-fit or otherwise carried by the housing 240. In addition, each leg 290, 292 may also include semicircular portions 299, 301, respectively, which may engage more surface area of the flange 303 to strengthen the retention of the component 20. Similar to the legs 90, 92 of the wire clip 86, the legs 290, 292 may be made of resilient or flexible material so that the legs 290, 292 may be displaced apart from each other to permit wider portions of the head 104 of the component 20 to pass therethrough and then return to their unflexed or otherwise original positions after passing the head 104 therethrough. Each leg 290, 292 may also have first and second ends 294, 296 that may extend or cross over each other and out of the housing 240 through the aperture 272. Accordingly, to disassemble the component 220 from the connector 218, the first and second ends 294, 296 may be pressed toward each other to spread the legs 290, 292 apart from each other by a distance that may be greater than the largest diameter portion 306 of the head 304, to facilitate removal of the component 20 from the fastener 286 and housing 240. Of course, the connector 218 may include more or less than two cantilevered legs that may have semi-circular, otherwise curved or linear portions depending on design requirements.

Figure 12:
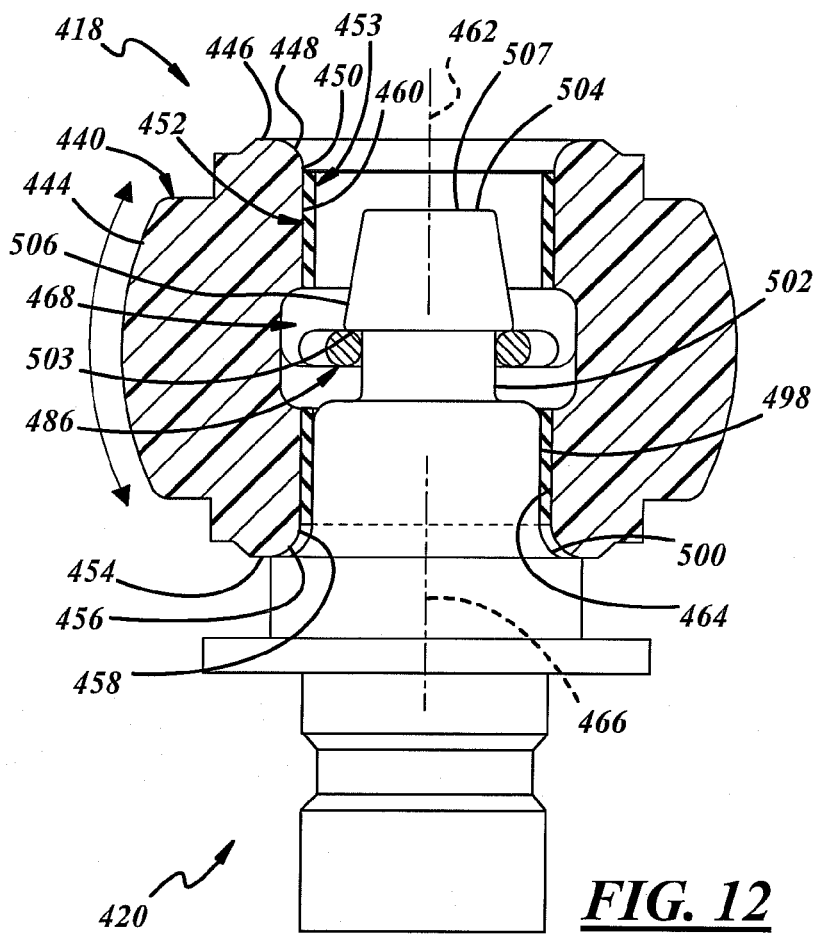
FIG. 12 is a partially sectional view of a multi-directional connector in still another form, with a friction element facilitating retention of the component within the housing.

Referring to FIG. 12, a multi-directional connector 418 in another form may include a housing 440 with a cavity 452 and may be similar to the connector 18 of FIG. 6 having the housing 40 with the cavity 52. However, the connector 418 may further have a friction element 453 which may be a layer of neoprene, rubber or other suitable material overmolded onto or otherwise carried by the housing 440 to surround one or more portions of the cavity 452, such as the first and second conduits 460, 464. The friction element 453 may contact one or more portions of the component 20, such as the shank 98, to inhibit removal of the component 20 from the housing 440. For example, the friction element 453 may require a force of about 30 Newtons to remove the component 29 from the housing 440 after the fastener 486 has been disengaged from the component 20. Of course, the friction element 453 may be used in combination or in replacement of the fastener 486. Also, the friction element may require more or less than 30 Newtons of force to remove the component 18 from the friction element 453 and connector 418.

It is contemplated that the multi-directional connector may have more than two openings that lead to a cavity and may be spaced apart in various directions and by various distances to provide a series of directions along which a component may be fastened to the connector to facilitate assembly.

While the forms of the invention herein disclosed constitute presently preferred embodiments, many others are possible. For example, while the connector 18 is shown at the transmission end of the cable assembly 14 it could also be at the shift lever end, or used with a cable assembly not associated with a transmission shift assembly. It is not intended herein to mention all the possible equivalent forms or ramifications of the invention. It is understood that the terms used herein are merely descriptive, rather than limiting, and that various changes may be made without departing from the spirit or scope of the invention.

The invention claimed is:

1. A shift cable assembly, comprising:
a conduit,
a core received within the conduit,
a rod coupled to an end of the core,
a slide tube in which the rod is received;
a multi-directional connector having a housing coupled to the rod, the housing having a first surface with a first opening and a second surface with a second opening, a cavity communicated between the first and second openings so that the cavity is adapted to receive a component through either one of the first and second openings, and a fastener extending into the cavity between the first and second openings to engage a component received in the cavity and retain the component relative to the housing, the housing being connectable to the component in the same manner whether the component is received in the first opening or second opening,
wherein the fastener is a wire clip that is evenly spaced between the first opening and the second opening, the wire clip including a pair of opposed legs having first and second ends, and
wherein the first and second ends of the wire clip extend outwardly from an aperture whereby the first and second ends are movable relative to each other to spread apart the opposed legs from each other and facilitate removal of the component from the housing,
wherein the housing has a barb for holding the wire clip in the housing, and the housing has a pocket communicated with the cavity opposite the aperture, so that the fastener is received through the aperture, the cavity, into the pocket and behind the barb; and
wherein the barb has a ramped surface extending from the cavity toward the pocket, and a catch spaced apart from the cavity, so that the fastener during assembly slides over the ramped surface and engages the catch.

2. The cable assembly of claim 1, wherein the first and second openings are diametrically opposite each other on the housing.

3. The cable assembly of claim 1, wherein the first opening has a first diameter, and the second opening has a second diameter equal to the first diameter.

4. The cable assembly of claim 1, wherein the legs of the wire clip are disposed in the cavity evenly spaced from the first opening and the second opening so that the legs engage the component in the same manner whether the component is inserted through the first opening or the second opening.

5. The cable assembly of claim 1 wherein the housing and the first opening and the second opening are constructed so that essentially the same retention force is provided between the housing and the component whether the component is received within the first opening or the second opening.

6. The cable assembly of claim 1, wherein the pair of opposed legs includes at least one cantilevered leg carried by the housing and the fastener is made of resilient metal.

* * * * *